(12) United States Patent
Sugiyama et al.

(10) Patent No.: US 12,365,166 B2
(45) Date of Patent: Jul. 22, 2025

(54) WOOD SHEET AND METHOD FOR MANUFACTURING WOOD SHEET AND MOLDED PRODUCT AND METHOD FOR MANUFACTURING MOLDED PRODUCT

(71) Applicant: Panasonic Intellectual Property Management Co., Ltd., Osaka (JP)

(72) Inventors: Tomonori Sugiyama, Osaka (JP); Kazuhiko Kaneuchi, Osaka (JP); Kota Yamaguchi, Osaka (JP); Hiroshi Asanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 351 days.

(21) Appl. No.: 17/476,552

(22) Filed: Sep. 16, 2021

(65) Prior Publication Data

US 2022/0111620 A1   Apr. 14, 2022

(30) Foreign Application Priority Data

Oct. 9, 2020 (JP) ................. 2020-171211

(51) Int. Cl.
*B32B 21/08* (2006.01)
*B32B 3/30* (2006.01)
(Continued)

(52) U.S. Cl.
CPC ............. *B32B 21/08* (2013.01); *B32B 3/30* (2013.01); *B32B 7/06* (2013.01); *B32B 7/12* (2013.01); *B32B 27/308* (2013.01); *B32B 27/36* (2013.01); *B32B 27/365* (2013.01); *B32B 37/10* (2013.01); *B32B 37/12* (2013.01); *B32B 2037/1253* (2013.01); *B32B 2255/08* (2013.01);
(Continued)

(58) Field of Classification Search
None
See application file for complete search history.

(56) References Cited

U.S. PATENT DOCUMENTS

2010/0080968 A1\* 4/2010 Mizuno ................... B32B 5/022
428/205
2015/0321454 A1\* 11/2015 Jinno ...................... B32B 37/12
428/512
(Continued)

FOREIGN PATENT DOCUMENTS

JP   2000-085072   3/2000
JP   2007-326369   12/2007
(Continued)

*Primary Examiner* — Chinessa T. Golden
(74) *Attorney, Agent, or Firm* — Wenderoth, Lind & Ponack, L.L.P.

(57) ABSTRACT

A wood sheet according to the present disclosure includes a protective layer, a support layer, a wood material made of natural wood provided between the protective layer and the support layer, a first adhesive layer provided between the protective layer and the wood material, a second adhesive layer provided between the first adhesive layer and the wood material, a thermoplastic shape conforming layer provided between the wood material and the support layer, and the first adhesive layer and the second adhesive layer are not integrated, and a boundary is provided between the first adhesive layer and the second adhesive layer.

11 Claims, 6 Drawing Sheets

(51) Int. Cl.
  *B32B 7/06*    (2019.01)
  *B32B 7/12*    (2006.01)
  *B32B 27/30*   (2006.01)
  *B32B 27/36*   (2006.01)
  *B32B 37/10*   (2006.01)
  *B32B 37/12*   (2006.01)

(52) U.S. Cl.
  CPC ....... *B32B 2255/26* (2013.01); *B32B 2307/71* (2013.01); *B32B 2317/16* (2013.01); *B32B 2457/00* (2013.01); *B32B 2605/003* (2013.01)

(56) References Cited

U.S. PATENT DOCUMENTS

2017/0106632 A1* 4/2017 Noda .................. B32B 27/18
2019/0100053 A1  4/2019 Kaneuchi et al.

FOREIGN PATENT DOCUMENTS

| JP | 2011-206998 | 10/2011 |
| JP | 2011-213018 | 10/2011 |
| JP | 2013-031927 | 2/2013 |
| JP | 2019-064168 | 4/2019 |

* cited by examiner

PRIOR ART

WOOD SHEET AND METHOD FOR MANUFACTURING WOOD SHEET AND MOLDED PRODUCT AND METHOD FOR MANUFACTURING MOLDED PRODUCT

BACKGROUND

1. Technical Field

The present disclosure relates to a wood sheet using natural wood, a molded product, a method for manufacturing a wood sheet, and a method for manufacturing a molded product.

2. Description of the Related Art

In recent years, in the decoration method of the surface of components and panels used in fields of the exterior of home appliances and the interior of vehicles, a wide range of design expressions and high-quality design are required due to the diversification of customer orientation and the recent orientation to genuineness and high quality. Among them, a wood sheet using natural wood is actively used as a decorative material in order to provide users with a texture derived from the material such as tactile sensation and appearance, and a high-class expression with excellent design. In the present specification, the decorative material refers to a sheet-shaped material having a thickness of 5 mm or less.

Japanese Patent Unexamined Publication No. 2019-64168 discloses a wooden decorative plate in which a transfer layer is formed on an upper portion of a veneer. FIGS. 9 and 10 show the wooden decorative plate described in Japanese Patent Unexamined Publication No. 2019-64168.

As shown in FIG. 9, the wooden decorative plate described in Japanese Patent Unexamined Publication No. 2019-64168 is composed of transfer layer 101, veneer 102, non-woven fabric 103, and first adhesive layer 104. Transfer layer 101 is transferred to one side of veneer 102 by hot pressing, and irregularities 106 similar in shape to an irregular surface shape of veneer 102 is formed thereon. Veneer 102 is impregnated with a resin such as polyethylene glycol as needed.

As shown in FIG. 10, transfer layer 101 is composed of hard coat layer 108 and veneer adhesive layer 107 on release layer 109 of base film 110. Transfer layer 101 serves as a protective layer on the surface of veneer 102. Since transfer layer 101 is a thin film, the durability of the product is improved while maintaining the original tactile sensation and appearance of veneer 102.

SUMMARY

According to an aspect of the present disclosure, there is provided a wood sheet including a protective layer, a support layer, a wood material made of natural wood provided between the protective layer and the support layer, a first adhesive layer provided between the protective layer and the wood material, a second adhesive layer provided between the first adhesive layer and the wood material, and a thermoplastic shape conforming layer provided between the wood material and the support layer, in which the first adhesive layer and the second adhesive layer are not integrated, and a boundary is provided between the first adhesive layer and the second adhesive layer.

According to another aspect of the present disclosure, there is provided a method for manufacturing a wood sheet, the method including forming a first adhesive layer on a protective layer, forming a second adhesive layer on a wood material, and forming a laminate by forming a non-thermocompression bonding laminate and then thermocompression bonding the non-thermocompression bonding laminate, the non-thermocompression bonding laminate including the protective layer, a support layer, the wood material provided between the protective layer and the support layer, the first adhesive layer provided between the wood material and the protective layer, the second adhesive layer provided between the first adhesive layer and the wood material, and a thermoplastic shape conforming layer provided between the wood material and the support layer.

According to another aspect of the present disclosure, there is provided a method for manufacturing a molded product, the method including forming a first adhesive layer on a protective layer, forming a second adhesive layer on a wood material, forming a laminate by forming a non-thermocompression bonding laminate and then thermocompression bonding the non-thermocompression bonding laminate, the non-thermocompression bonding laminate including the protective layer, a support layer, the wood material provided between the protective layer and the support layer, the first adhesive layer provided between the wood material and the protective layer, the second adhesive layer provided between the first adhesive layer and the wood material, and a thermoplastic shape conforming layer provided between the wood material and the support layer, and forming a resin housing on the support layer side of the laminate.

DETAILED DESCRIPTIONS

Background to the Present Disclosure

Figure 1A:
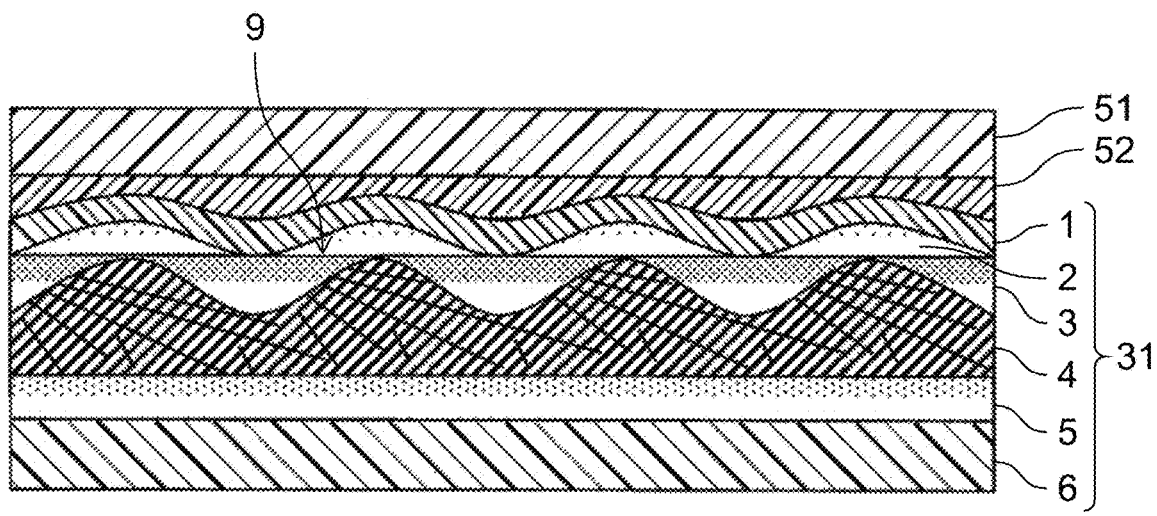
FIG. 1A is a cross-sectional view schematically showing a cross-sectional structure of a wood sheet according to a first exemplary embodiment of the present disclosure.

When applying a wood sheet to the exterior of home appliances or interiors of vehicles, a protective layer that conforms to the shape of a veneer is formed on the surface of the veneer made of wood material in order to improve the durability of the product while maintaining the original tactile sensation and appearance. The protective layer is formed by hot pressing on wood material.

During hot pressing, the water in the wood material becomes water vapor and flows out from the wood material toward the protective layer. However, since the further outflow of water vapor to the outside is blocked by the protective layer, convex bubbles are generated on the surface of the protective layer, resulting in poor appearance of the wood sheet.

In addition, when the wood material is impregnated with a resin, the resin is softened by the heat during hot pressing and exudes to the surface of the protective layer, causing stickiness or shine, resulting in poor appearance of the wood sheet. Further, the appearance may be deteriorated as well due to changes over time.

The wooden decorative plate described in Japanese Patent Unexamined Publication No. 2019-64168 still has room for improvement in terms of suppressing poor appearance.

Therefore, the inventors of the present disclosure diligently studied the occurrence of poor appearance during processing and due to changes over time, and examined a configuration in which a second adhesive layer different from the first adhesive layer is formed in advance on the surface of the wood material, which serves as a barrier layer on the surface of the wood material. This configuration suppresses the movement of substances from the wood material to the protective layer. As a result, the inventors of the present disclosure have found that poor appearance of the wood sheet can be suppressed.

Based on these novel findings, the inventors of the present disclosure have reached the following disclosure.

An object of the present disclosure is to provide a wood sheet in which the occurrence of poor appearance due to processing and changes over time is suppressed in solving the above problems.

A wood sheet of a first aspect of the present disclosure includes a protective layer, a support layer, a wood material made of natural wood provided between the protective layer and the support layer, a first adhesive layer provided between the protective layer and the wood material, a second adhesive layer provided between the first adhesive layer and the wood material, a thermoplastic shape conforming layer provided between the wood material and the support layer, and the first adhesive layer and the second adhesive layer are not integrated, and a boundary is provided between the first adhesive layer and the second adhesive layer.

With such a configuration, since the second adhesive layer is provided on the surface of the wood material, the movement of substances from the wood material to the protective layer is suppressed, and thus the occurrence of poor appearance of the wood sheet can be suppressed.

In the wood sheet of a second aspect of the present disclosure, the wood material may have an irregular surface shape, the second adhesive layer may have penetrated into a concave portion of the irregular surface shape of the wood material, and there may be no air layer between the second adhesive layer and the irregular surface shape of the wood material.

With such a configuration, since there is no air layer between the wood material and the second adhesive layer, the substance flowing out from the wood material cannot move on the surface of the wood material, and the movement of the substance can be limited to the inside of the wood material.

In the wood sheet of a third aspect of the present disclosure, the first adhesive layer and the second adhesive layer each may have a crosslinking structure.

With such a configuration, the first adhesive layer and the second adhesive layer have a dense structure.

In the wood sheet of a fourth aspect of the present disclosure, the first adhesive layer may contain a blocked isocyanate-based curing agent, and the first adhesive layer may have a urethane bond.

With such a configuration, a crosslinking structure is formed in the first adhesive layer.

In the wood sheet of a fifth aspect of the present disclosure, an average film thickness of the first adhesive layer may be 3 μm or more and 100 μm or less, and an average film thickness of the second adhesive layer may be 10 μm or more and 100 μm or less.

With such a configuration, the adhesiveness of the first adhesive layer and the function of the second adhesive layer as a barrier layer can be improved, and the manufacturing cost of the wood sheet can be suppressed.

The wood sheet of a sixth aspect of the present disclosure may further include a release layer disposed on a surface of the protective layer opposite to the first adhesive layer, and a base film disposed on a surface of the release layer opposite to the protective layer, the protective layer may have a film thickness of 3 μm or more and 100 μm or less, and have a hard coat function and a UV cut function, and the release layer and the base film may be removable from the protective layer at an interface between the release layer and the protective layer.

With such a configuration, since the protective layer is protected by the base film, the irregular surface shape of the protective layer is not crushed. Therefore, a protective layer can be formed on the surface of the wood material while maintaining the original tactile sensation and appearance of the wood. Further, the protective layer improves the protective function and shape conformability on the surface of the wood material. Further, since the protective layer has a hard coat function and a UV cut function, the protective layer protects the wood material from damage, deformation, deterioration due to ultraviolet rays, and the like.

The wood sheet of a seventh aspect of the present disclosure may further include a third adhesive layer provided between the wood material and the thermoplastic shape conforming layer.

With such a configuration, since adhesive layers that function as barrier layers are formed on both sides of the wood material, the movement of substances from the wood material to the protective layer is further suppressed, and thus the occurrence of poor appearance of the wood sheet is further suppressed.

A molded product of an eighth aspect of the present disclosure includes the wood sheet and a resin housing disposed on the support layer side of the wood sheet.

With such a configuration, it is possible to suppress the occurrence of poor appearance of the molded product and improve its strength.

A method for manufacturing a wood sheet of a ninth aspect of the present disclosure includes forming a first adhesive layer on a protective layer, forming a second adhesive layer on a wood material, and forming a laminate by forming a non-thermocompression bonding laminate and then thermocompression bonding the non-thermocompression bonding laminate, the non-thermocompression bonding laminate including the protective layer, a support layer, the wood material provided between the protective layer and the support layer, the first adhesive layer provided between the wood material and the protective layer, the second adhesive layer provided between the first adhesive layer and the wood material, and a thermoplastic shape conforming layer provided between the wood material and the support layer.

By such a method, the first adhesive layer and the second adhesive layer are formed in separate processes.

In the method for manufacturing a wood sheet of a tenth aspect of the present disclosure, the second adhesive layer may be formed by being applied to the surface of the wood material in a liquid state.

By such a method, no air layer is formed between the second adhesive layer and the wood material.

In the method for manufacturing a wood sheet of an eleventh aspect of the present disclosure, the second adhesive layer may be cured before the forming a laminate.

By such a method, the second adhesive layer is cured before thermocompression bonding of the wood sheet, and can function as a barrier layer in a thermocompression bonding process.

A method for manufacturing a molded product of a twelfth aspect of the present disclosure includes forming a first adhesive layer on a protective layer, forming a second adhesive layer on a wood material, forming a laminate by forming a non-thermocompression bonding laminate and then thermocompression bonding the non-thermocompression bonding laminate, the non-thermocompression bonding laminate including the protective layer, a support layer, the wood material provided between the protective layer and the support layer, the first adhesive layer provided between the wood material and the protective layer, the second adhesive layer provided between the first adhesive layer and the wood material, and a thermoplastic shape conforming layer provided between the wood material and the support layer, and forming a resin housing on the support layer side of the laminate.

By such a method, a molded product having a resin housing can be formed.

According to the present disclosure, it is possible to provide a wood sheet in which the occurrence of poor appearance due to processing and changes over time is suppressed.

First Exemplary Embodiment

Overall Configuration

Figure 1B:
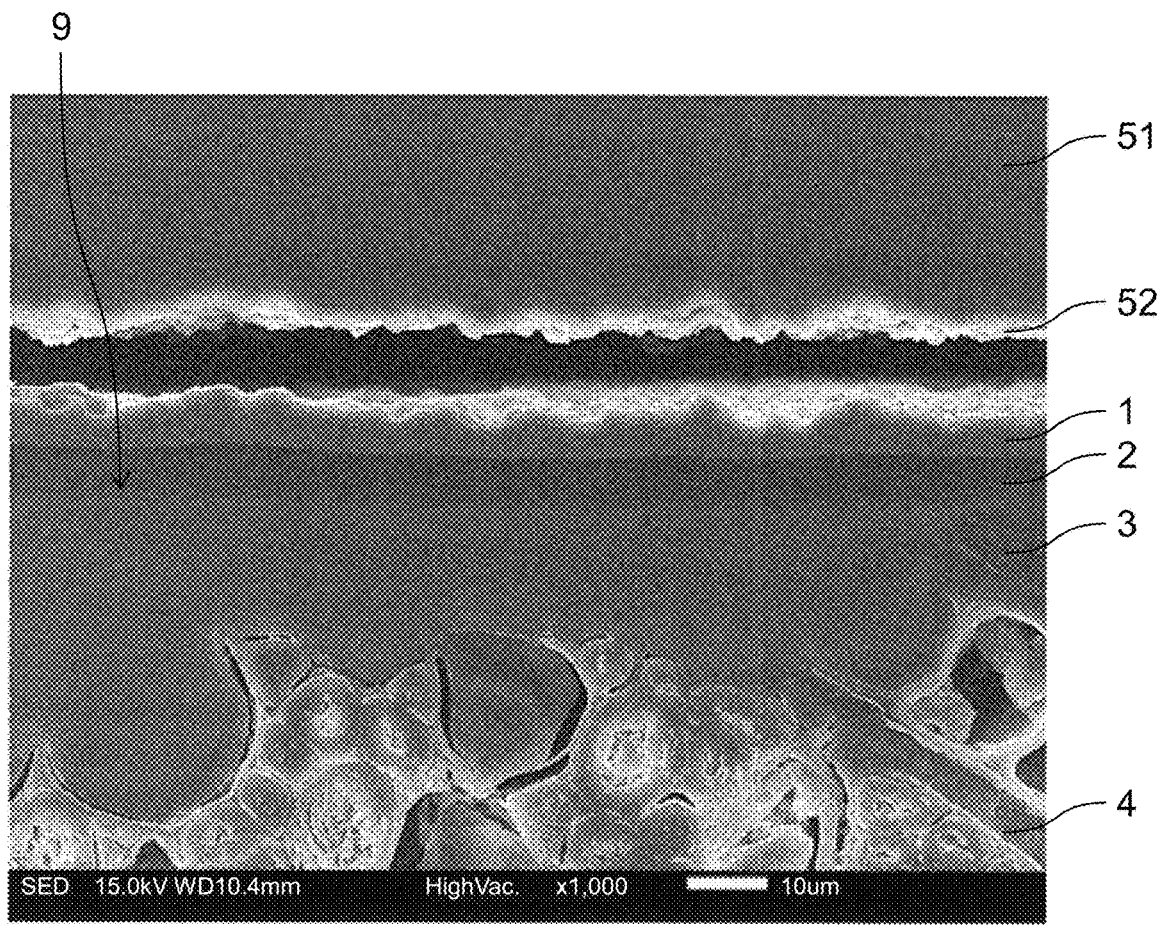
FIG. 1B is a partially enlarged SEM image of a cross section of the wood sheet of FIG. 1A.
Figure 2:
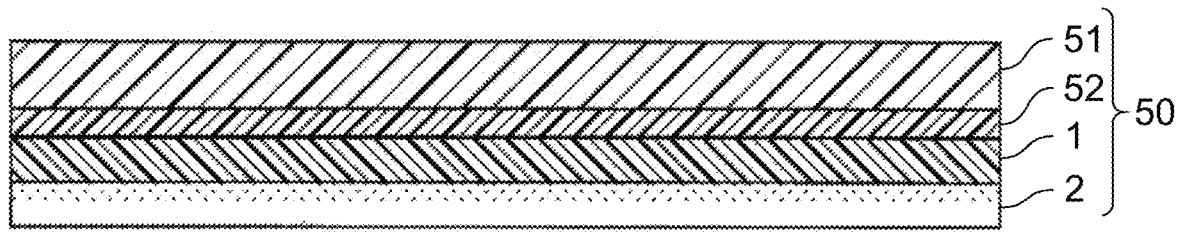
FIG. 2 is a cross-sectional view of a transfer film used for manufacturing the wood sheet according to the first exemplary embodiment of the present disclosure.

FIG. 1A is a cross-sectional view of a laminate composed of wood sheet 31, base film 51, and release layer 52 according to a first exemplary embodiment of the present disclosure. FIG. 1B is a partially enlarged SEM image of wood sheet 31 of FIG. 1A. FIG. 2 is a cross-sectional view of transfer film 50.

As shown in FIG. 1A, when viewed from the surface side, wood sheet 31 is composed of a laminate in which protective layer 1, first adhesive layer 2, second adhesive layer 3, wood material 4, thermoplastic shape conforming layer 5, support layers 6 are laminated in this order.

Hereinafter, each member constituting wood sheet 31, base film 51, and release layer 52 will be described.

Transfer Film

As shown in FIG. 2, transfer film 50 is a film composed of first adhesive layer 2 and protective layer 1, which are a part of wood sheet 31, base film 51, and release layer 52. Transfer film 50 serves to transfer protective layer 1 to wood material 4 in the manufacturing process of wood sheet 31. After protective layer 1 is transferred to wood material 4, base film 51 and release layer 52 may be removed from wood sheet 31 at the interface between release layer 52 and protective layer 1, as needed.

Base Film

Base film 51 is disposed away from the surface of release layer 52 opposite to protective layer 1. Base film 51 serves to protect the irregular surface shape of protective layer 1 to be described later in the manufacturing process of wood sheet 31. Base film 51 is formed of, for example, a polymer material such as a polyethylene terephthalate resin, an acrylic resin, or a polycarbonate resin. The average film thickness of base film 51 may be, for example, 20 µm or more and 50 µm or less. Since the thickness of base film 51 is 20 µm or more, it is possible to suppress the occurrence of wrinkles, tears, warpage, and the like in base film 51 by thermal drying or the like in the process of forming each layer of transfer film 50. Further, since the film thickness of base film 51 is 50 µm or less, the conformability of base film 51 to wood material 4 can be improved. Further, if the thickness of base film 51 is 50 µm or less, when transfer film 50 is formed of a roll film, the overall weight of transfer film 50 is reduced, the handleability of transfer film 50 in portability or the like is improved, and the manufacturing cost can be suppressed.

Release Layer

Release layer 52 is disposed on the surface of protective layer 1 opposite to first adhesive layer 2, and serves to peel off base film 51 from wood sheet 31. For example, release layer 52 is formed of a thermosetting melamine resin, a two-component curable urethane resin, a thermosetting silicone resin, or the like. The film thickness of release layer 52 is not particularly limited, and any thickness can be selected as long as the effect of peeling can be obtained.

Protective Layer

Protective layer 1 is disposed on one surface of wood material 4 in a state of conforming to the shape of wood material 4 via first adhesive layer 2 and second adhesive layer 3 to be described later. Protective layer 1 serves to protect wood material 4 from damage, deformation, deterioration due to ultraviolet rays, and the like, and is formed of a material having a hard coat function and a UV cut function. Examples of the material having a hard coat function include an aftercure-type UV curable acrylic resin. When an aftercure-type material is used, after a laminate composed of wood sheet 31, base film 51, and release layer 52 is formed, and base film 51 and release layer 52 are removed, protective layer 1 may be cured by irradiation with ultraviolet rays or EB. By such a forming method, protective layer 1 is not completely cured at the time of forming the laminate, and protective layer 1 has improved conformability and is less likely to crack.

On the other hand, as the material of protective layer 1, a precure-type UV curable acrylic resin, a thermal drying-type single-component acrylic resin, a thermal drying-type two-component curable urethane acrylic resin, and an EB (electron beam) curable acrylic resin may be used. Furthermore, other materials having a hard coat function and a UV cut function may be used.

The average film thickness of protective layer 1 may be, for example, 3 µm or more and 100 µm or less. The average film thickness in the present specification refers to a value obtained by measuring the thickness of the layer at a plurality of points of the layer and calculating the average thereof. Further, it is more desirable that the average film thickness of protective layer 1 is 3 µm or more and 20 µm or less. Since the average film thickness of protective layer 1 is 20 µm or less, the distance from wood material 4 becomes short, and the original texture of wood material 4 can be expressed without feeling the depth and glossiness of protective layer 1.

Protective layer 1 may be provided together with other functional layers such as a layer to which an additive such as a filler is applied, a coloring layer, and a pattern layer, which are formed by using a general printing technique.

First Adhesive Layer

First adhesive layer 2 is disposed between protective layer 1 and second adhesive layer 3, and serves to adhere protective layer 1 and second adhesive layer 3. First adhesive layer 2 is made of resin. For example, first adhesive layer 2 includes, as an adhesive main agent, a vinyl chloride-vinyl acetate copolymer resin, an olefin-based resin, a polyolefin-based resin, a urethane-based resin, an acrylic-based resin, or the like, and forms a crosslinking structure in the layer. Further, as a curing agent for first adhesive layer 2, a blocked isocyanate-based curing agent is added to first adhesive layer 2 to form a crosslinking structure of an adhesive main agent and a urethane bond.

First adhesive layer 2 is formed on the surface of protective layer 1 by, for example, screen printing or a coater.

The average film thickness of first adhesive layer 2 may be, for example, 3 µm or more and 100 µm or less. In order to improve the conformability of wood material 4 to the surface, it is more desirable that the average film thickness of first adhesive layer 2 is 10 µm or more and 50 µm or less.

Second Adhesive Layer

Second adhesive layer 3 is disposed in advance between first adhesive layer 2 and wood material 4 along the surface of wood material 4, which serves as a barrier layer that prevents substances in wood material 4 from moving into protective layer 1. Second adhesive layer 3 is adhered to first adhesive layer 2. In the manufacturing method described later, since second adhesive layer 3 is cured before being adhered to first adhesive layer 2, as shown in FIGS. 1A and 1B, boundary 9 is formed between first adhesive layer 2 and second adhesive layer 3, and they are not integrated. Further, second adhesive layer 3 has penetrated into a concave portion of the irregular surface shape of wood material 4. Therefore, as shown in FIG. 1B, no air layer is formed between second adhesive layer 3 and wood material 4, especially even in the concave portion of the irregular surface shape of wood material 4, so that the function of second adhesive layer 3 as a barrier layer is improved.

Second adhesive layer 3 is made of resin. For example, second adhesive layer 3 includes, as an adhesive main agent, a vinyl chloride-vinyl acetate copolymer resin, an olefin-based resin, a polyolefin-based resin, a urethane-based resin, an acrylic-based resin, or the like, and has a crosslinking structure in the layer. The process of forming the crosslinking structure includes, for example, ultraviolet rays, EB irradiation, thermosetting, catalytic reaction, and the like.

The average film thickness of second adhesive layer 3 may be, for example, 10 µm or more and 100 µm or less. Further, it is more desirable that the average film thickness of second adhesive layer 3 is 20 µm or more and 80 µm or less.

Wood Material

Wood material 4 is formed of wood derived from natural wood containing moisture inside, and has an irregular surface shape due to a vessel pipe, a depression, or the like on the surface thereof, as shown in FIG. 1B. Wood material 4 is a thinly sliced sheet-shaped plate material, and the average plate thickness thereof may be, for example, 0.1 mm or more and 2 mm or less. Since the average plate thickness of wood material 4 is 0.1 mm or more, damage thereof is prevented and workability is improved, while the average plate thickness is 2 mm or less, so that wood material 4 is sufficiently shaped into the product shape.

In order to improve the mechanical strength and toughness of wood material 4, the inside of wood material 4 is impregnated with an organic resin. The inside of wood material 4 may be impregnated with an organic resin having a chain structure. For example, by impregnating an organic resin having a chain structure such as polyethylene glycol or a phenol resin, the flexibility of wood material 4 is improved and wood material 4 is easily deformed.

Further, in order to improve the appearance or functionality, another material such as a pigment, a phosphorescent paint, a dye, or a flame retardant may be added to one surface or both surfaces of wood material 4. Further, one surface or both surfaces of wood material 4 may be subjected to a treatment such as decolorization or imparting a pattern.

Thermoplastic Shape Conforming Layer

Thermoplastic shape conforming layer 5 is disposed between wood material 4 and support layer 6, and serves to adhere wood material 4 and support layer 6. Thermoplastic shape conforming layer 5 is formed of a transparent thermoplastic material. For example, thermoplastic shape conforming layer 5 is formed to have olefin-based and polyolefin-based components. The average film thickness of thermoplastic shape conforming layer 5 may be, for example, 50 µm or more and 200 µm or less. Since the average film thickness of thermoplastic shape conforming layer 5 is 50 µm or more, the adhesiveness between wood material 4 and support layer 6 can be improved, and since the average film thickness of thermoplastic shape conforming layer 5 is 200 µm or less, the manufacturing cost can be reduced.

Support Layer

Support layer 6 serves to improve the strength of wood sheet 31. When pressure is applied to wood sheet 31, support layer 6 cushions the deformation, so that damage to wood sheet 31 can be suppressed. Support layer 6 is formed of, for example, a polymer film such as polyethylene terephthalate or acrylic, or a non-woven fabric.

Effect

With wood sheet 31 according to the first exemplary embodiment, the following effects can be obtained.

Wood sheet 31 includes protective layer 1, support layer 6, and wood material 4 made of natural wood provided between protective layer 1 and support layer 6. First adhesive layer 2 is provided between protective layer 1 and wood material 4. Second adhesive layer 3 is provided between first adhesive layer 2 and wood material 4. Thermoplastic shape conforming layer 5 is provided between wood material 4 and support layer 6. First adhesive layer 2 and second adhesive layer 3 are not integrated, and boundary 9 is provided between first adhesive layer 2 and second adhesive layer 3.

With such a configuration, since second adhesive layer 3 is formed on the surface of wood material 4, the movement of water vapor and the impregnated resin from wood material 4 to protective layer 1 during thermocompression bonding and changes over time is suppressed. Second adhesive layer 3 provided on the surface of wood material 4 suppresses the generation of convex bubbles due to water vapor, exudation of the impregnated resin, stickiness, or shine on the surface of protective layer 1. Thus, it is possible to suppress the occurrence of poor appearance of wood sheet 31.

Wood material 4 has an irregular surface shape, second adhesive layer 3 has penetrated into concave portion S3 of the irregular surface shape of wood material 4, and there is no air layer between second adhesive layer 3 and the irregular surface shape of wood material 4.

With such a configuration, there is no air layer through which substances that can flow out from wood material 4 can move between wood material 4 and second adhesive layer 3 or on the surface of wood material 4. Therefore, the movement of the substances that can flow out from wood material 4 can be limited to the movement in wood material 4 in the direction toward the end face thereof.

First adhesive layer 2 and second adhesive layer 3 each have a crosslinking structure.

With such a configuration, first adhesive layer 2 and second adhesive layer 3 have a dense structure. Due to the above-mentioned dense structure, the strength of first adhesive layer 2 is improved, and wood sheet 31 is prevented from being damaged in an evaluation process carried out after the manufacturing process. On the other hand, due to the above-mentioned dense structure, second adhesive layer 3 prevents the water vapor and the impregnated resin contained in wood material 4 from flowing out from wood material 4.

First adhesive layer 2 contains a blocked isocyanate-based curing agent, and first adhesive layer 2 has a urethane bond.

With such a configuration, a crosslinking structure is formed in first adhesive layer 2.

The average film thickness of first adhesive layer 2 is 3 µm or more and 100 µm or less, and the average film thickness of second adhesive layer 3 is 10 µm or more and 100 µm or less.

With such a configuration, since the average film thickness of first adhesive layer 2 is 3 µm or more, the adhesiveness between protective layer 1 and second adhesive layer 3 can be improved. Since the average film thickness of second adhesive layer 3 is 10 µm or more, second adhesive layer can function as a barrier layer. Further, since the average film thicknesses of first adhesive layer 2 and second adhesive layer 3 is 100 µm or less, the manufacturing cost can be reduced, furthermore, the flexibility of wood material 4 can be maintained, and the shapability of the entire wood sheet 31 is improved.

Wood sheet 31 further includes release layer 52 disposed on the surface of protective layer 1 opposite to first adhesive layer 2, and base film 51 disposed on the surface of release layer 52 opposite to protective layer 1. Protective layer 1 has a film thickness of 3 µm or more and 100 µm or less, and has a hard coat function and a UV cut function. Release layer 52 and base film 51 are removable from protective layer 1 at the interface between release layer 52 and protective layer 1.

With such a configuration, since protective layer 1 is protected by base film 51, the irregular surface shape of protective layer 1 formed by conforming to the surface of wood material 4 is not crushed, and wood sheet 31 can be formed. Due to the irregular surface shape of protective layer 1, the original tactile sensation and appearance of the wood are maintained, and a texture derived from the material and a high-class expression with excellent design are realized in wood sheet 31.

Further, since the film thickness of protective layer 1 is 3 µm or more, the protective function can be exhibited on the surface of wood material 4. Since the film thickness is 100 µm or less, the shape conformability of wood material 4 to the irregular surface shape is improved. Further, since protective layer 1 has a hard coat function and a UV cut function, protective layer 1 protects wood material 4 from damage, deformation, deterioration due to ultraviolet rays, and the like.

Manufacturing Method

Next, a method for manufacturing wood sheet 31 will be described.

Figure 3:
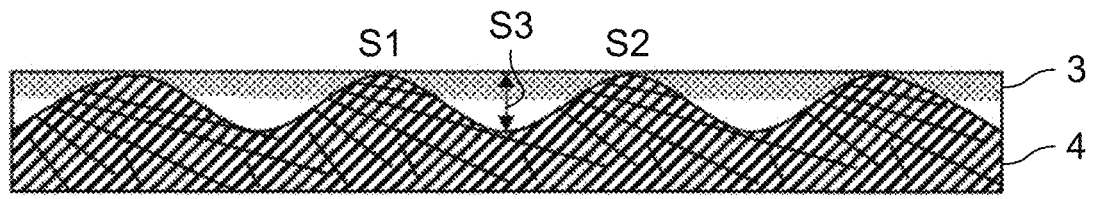
FIG. 3 is a cross-sectional view of a second adhesive layer and a wood material forming a part of the wood sheet according to the first exemplary embodiment of the present disclosure.
Figure 4:
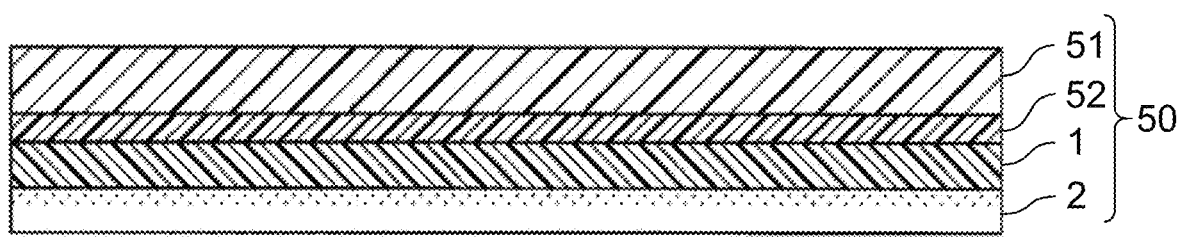
FIG. 4 is a cross-sectional view of the wood sheet according to the first exemplary embodiment of the present disclosure before a thermocompression bonding process.
Figure 4:
Figure 4:
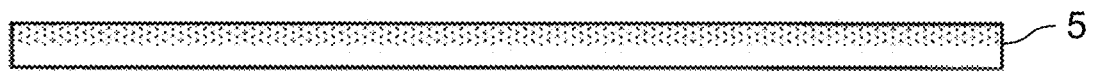
Figure 4:
Figure 5:
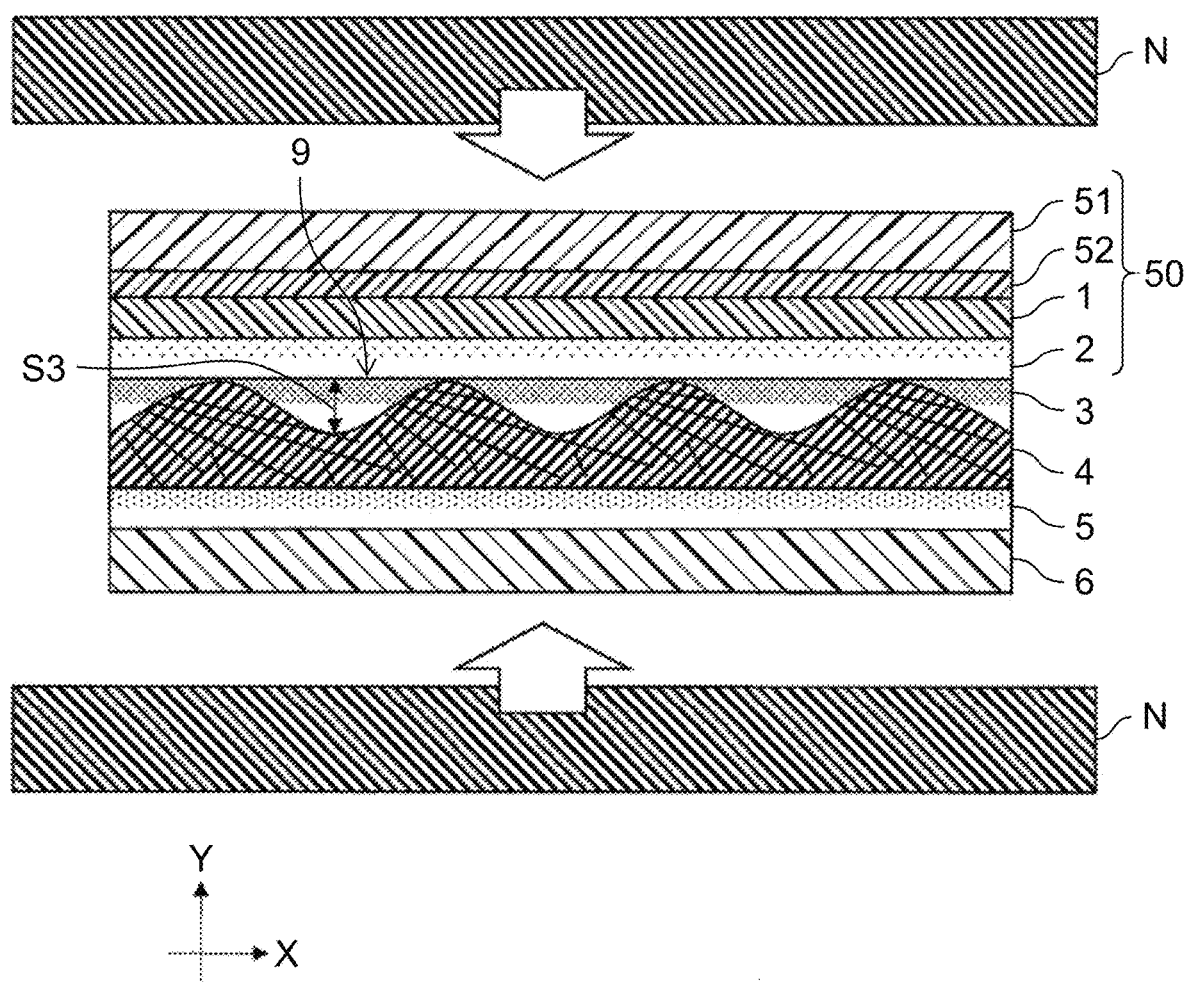
FIG. 5 is a cross-sectional view of the wood sheet according to the first exemplary embodiment of the present disclosure during the thermocompression bonding process.
Figure 6:
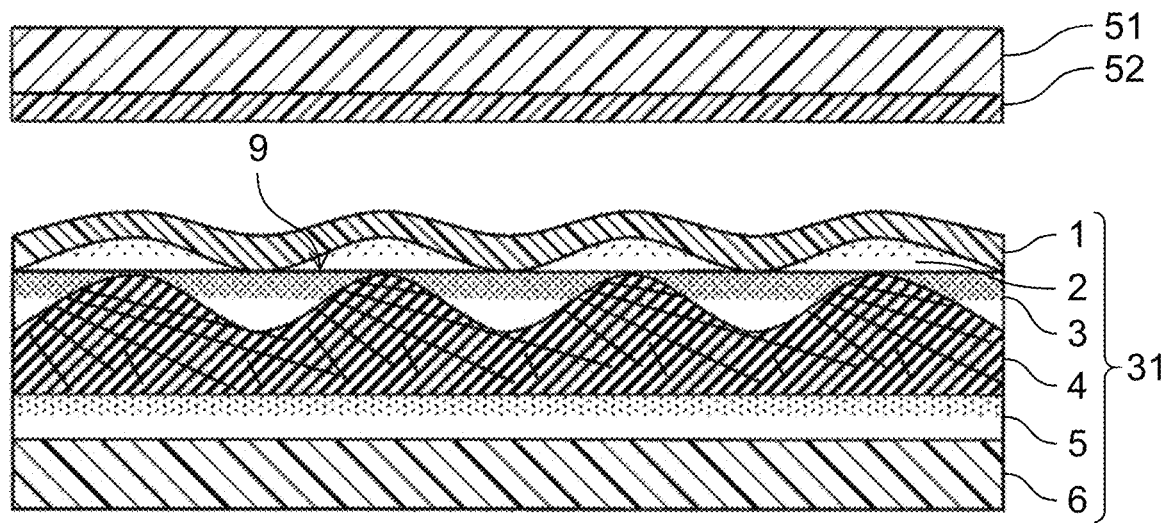
FIG. 6 is a cross-sectional view of the wood sheet according to the first exemplary embodiment of the present disclosure after the thermocompression bonding process.

FIG. 3 is a cross-sectional view of second adhesive layer 3 and wood material 4. FIG. 4 is a cross-sectional view of wood sheet 31 before the thermocompression bonding process. FIG. 5 is a cross-sectional view of the wood sheet during the thermocompression bonding process. In FIG. 5, an X direction along the cross-sectional direction and a Y direction orthogonal to the cross-sectional direction are indicated by arrows. FIG. 6 is a cross-sectional view of the wood sheet after the thermocompression bonding process.

The method for manufacturing wood sheet 31 includes step S11 of forming first adhesive layer 2 on protective layer 1, step S12 of forming second adhesive layer 3 on wood material 4, and step S14 of forming a laminate by thermocompression bonding. In step S14, protective layer 1 in which first adhesive layer 2 is disposed on the lower side, wood material 4 in which second adhesive layer 3 is disposed on the upper side, thermoplastic shape conforming layer 5, and support layer 6 are laminated in this order from the top along the Y direction of FIG. 5 and thermocompression bonded to each other.

First, first adhesive layer 2 is formed on protective layer 1 to form transfer film 50 (step S11). Transfer film 50 may be formed as a single-wafer film, or may be formed as a continuous roll film in order to improve productivity.

Subsequently, as shown in FIG. 3, second adhesive layer 3 is formed by being applied to one surface of wood material 4 in a liquid state by, for example, a process such as spray spraying, roll coater, or ink jet coating (step S12). Since second adhesive layer 3 is formed in a liquid state having fluidity, it can penetrate into concave portion S3 sandwiched between convex portion 51 and convex portion S2 on the surface of wood material 4. Further, although the surface of second adhesive layer 3 shown in FIG. 3 is flat, the surface of second adhesive layer 3 may be a wavy curved surface along wood material 4.

Subsequently, in order to cure second adhesive layer 3, a treatment is performed using an appropriate curing process for the adhesive main agent and the added curing agent, such as thermosetting and UV curing (step S13). Second adhesive layer 3 is cured in a state of being penetrated into concave portion S3.

After step S13, as shown in FIG. 4, a non-thermocompression bonding laminate including transfer film 50, wood material 4, thermoplastic shape conforming layer 5, and support layer 6 in this order is formed. Further, the surface of transfer film 50 on which first adhesive layer 2 is formed and the surface of wood material 4 on which second adhesive layer 3 is formed are disposed so as to face each other.

Subsequently, as shown in FIG. 5, the non-thermocompression bonding laminate is thermocompression bonded by thermocompression bonding device N (step S14). The hot-melted first adhesive layer 2 adheres protective layer 1 and second adhesive layer 3 cured in step S13. Since first adhesive layer 2 is cured by a process different from that of second adhesive layer 3, boundary 9 is formed between first adhesive layer 2 and second adhesive layer 3. Further, hot-melted thermoplastic shape conforming layer 5 adheres wood material 4 and support layer 6. The irregular surface shape of wood material 4 is transferred by being conformed to by first adhesive layer 2 and protective layer 1. Further, since protective layer 1 is protected from the pressure of thermocompression bonding device N by base film 51 without directly touching thermocompression bonding device N, the irregular surface shape transferred to protective layer 1 is not crushed in step S14. In step S14, a laminate of wood sheet 31, release layer 52, and base film 51 is formed.

During thermocompression bonding, water vapor is generated from the inside of wood material 4. Since the barrier layer formed by cured second adhesive layer 3 is formed on the surface of wood material 4, the outflow of water vapor in the Y direction on protective layer 1 side is suppressed. Further, since the air layer does not remain in concave portion S3 after the formation of second adhesive layer 3, there is no layer through which water vapor can move between wood material 4 and second adhesive layer 3 or on the surface of wood material 4. Therefore, the movement of water vapor is limited to the X direction toward the end face of wood material 4, and the water vapor flows out from the end face of wood material 4. Further, when wood material 4 is impregnated with the organic resin having a chain structure, by forming second adhesive layer 3 on the surface of wood material 4 by the heat and pressure during the thermocompression bonding process, the exudation of the impregnated resin in the Y direction can be suppressed as in the case of water vapor. In addition, the exudation of the impregnated resin due to changes over time can be similarly suppressed. The movement of the impregnated resin is also limited to the X direction as in the case of water vapor.

Subsequently, as shown in FIG. 6, after the completion of thermocompression bonding, release layer 52 and base film 51 are removed from wood sheet 31 at the interface with protective layer 1 to obtain wood sheet 31 (step S15).

Effect

With the method for manufacturing wood sheet 31 according to the first exemplary embodiment, the following effects can be obtained.

Second adhesive layer 3 is formed by being applied to the surface of wood material 4 in a liquid state.

By such a method, second adhesive layer 3 in the liquid state can expel air from concave portion S3 on the surface of wood material 4 in step S12, and no air layer is formed between second adhesive layer 3 and wood material 4.

Second adhesive layer 3 is cured before step S14 of forming the laminate.

By such a method, second adhesive layer 3 cured before step S14 suppresses the movement of the water vapor and the impregnated resin toward protective layer 1 during step S14, and in protective layer 1, it is possible to suppress the generation of air bubbles due to water vapor, exudation of impregnated resin, shine, stickiness, and the like. Therefore, wood sheet 31 in which the occurrence of poor appearance is suppressed can be obtained. In addition, second adhesive layer 3 can suppress the occurrence of poor appearance due to exudation of the impregnated resin due to changes over time in completed wood sheet 31.

In the first exemplary embodiment, it has been described that release layer 52 is formed of a thermosetting melamine resin, a two-component curable urethane resin, a thermosetting silicone resin, or the like. However, the material is not limited to these materials, and any material that can obtain the same effect may be used.

In the first exemplary embodiment, it has been described that when an aftercure-type material is used for protective layer 1, protective layer 1 is cured by ultraviolet rays and EB irradiation in the final process of peeling off release layer 52. However, the order is not limited to this order, and protective layer 1 may be cured at an appropriate timing in the manufacturing process of wood sheet 31 depending on the application.

In the first exemplary embodiment, although it has been described that wood material 4 is a single sheet of natural wood, wood material 4 is not limited thereto, and wood material 4 may be a processed sheet-shaped wood plate in which a plurality of sheets of natural wood are laminated and sliced to an average plate thickness of 0.1 mm or more and 2 mm or less. In addition, parquet may be applied.

First adhesive layer 2 and second adhesive layer 3 may be formed of the same material. Even when first adhesive layer 2 and second adhesive layer 3 are formed of the same material, second adhesive layer 3 is cured before the thermocompression bonding process S14. Accordingly, boundary 9 is formed between first adhesive layer 2 and second adhesive layer 3.

In the first exemplary embodiment, it has been described that release layer 52 and base film 51 are removed after the thermocompression bonding process S14. However, the removal of release layer 52 and base film 51 can be performed between any processes. Therefore, in the state in which release layer 52 and base film 51 are not removed, it is also possible to store wood sheet 31 attached with release layer 52 and base film 51.

In the first exemplary embodiment, although an example in which second adhesive layer 3 is formed on one surface of wood material 4 has been described, the present disclosure is not limited thereto. Second adhesive layers 3 may be provided on both surfaces of wood material 4. That is, second adhesive layers 3 may be formed on the surface of wood material 4 on the side of the second adhesive layer and on the surface of wood material 4 on the side of thermoplastic shape conforming layer 5. Further, second adhesive layer 3 may be formed on one surface of wood material 4 and cured, and then second adhesive layer 3 may be formed on the other surface and cured. Alternatively, second adhesive layers 3 may be formed on both surfaces of wood material 4 at the same time by dipping or the like and cured.

First Modification Example

Figure 7:
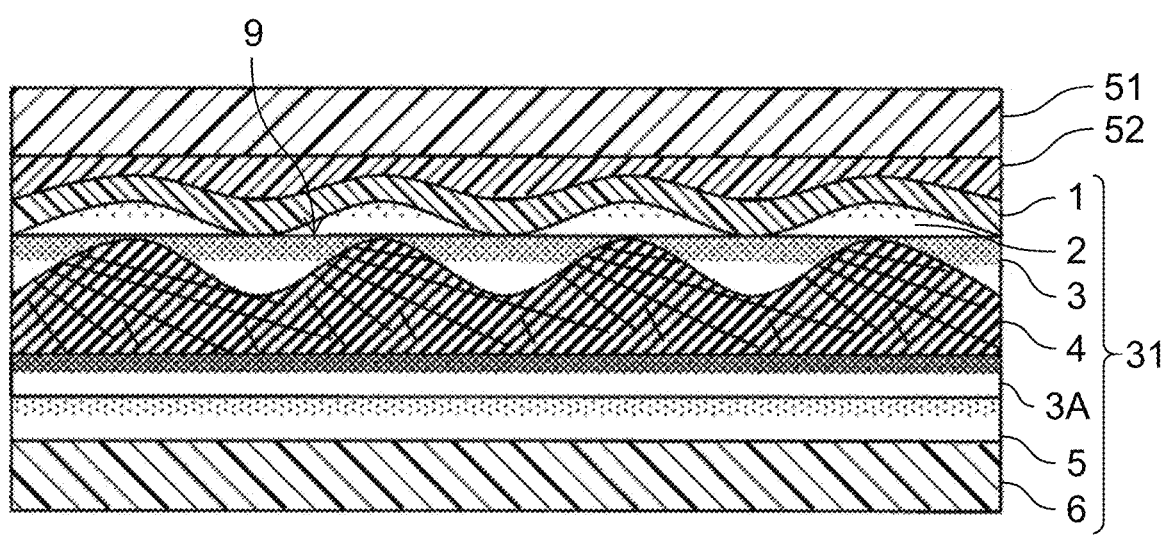
FIG. 7 is a cross-sectional view of a modification example of the wood sheet according to the first exemplary embodiment of the present disclosure.

FIG. 7 is a cross-sectional view of wood sheet 31 in which second adhesive layer 3 and third adhesive layer 3A are formed on both sides of wood material 4. As shown in FIG. 3, third adhesive layer 3A is also provided between wood material 4 and thermoplastic shape conforming layer 5, so that adhesive layers 3 and 3A are provided on both surfaces of wood material 4.

With such a configuration, adhesive layers 3 and 3A serving as barrier layers are formed on both surfaces of wood material 4, and the water vapor discharged from wood material 4 during the thermocompression bonding process and the impregnated resin of wood material 4 are more easily removed from the end face of wood material 4. The generation of convex bubbles, exudation, stickiness, shine, and the like on the surface of protective layer 1 can be further suppressed.

Second Exemplary Embodiment

Molded product 71 according to a second exemplary embodiment of the present disclosure will be described. In the second exemplary embodiment, the points different from the first exemplary embodiment will be mainly described. In the second exemplary embodiment, the same or equivalent configurations as those in the first exemplary embodiment are designated by the same reference numerals, and duplicate description will be omitted.

Figure 8:
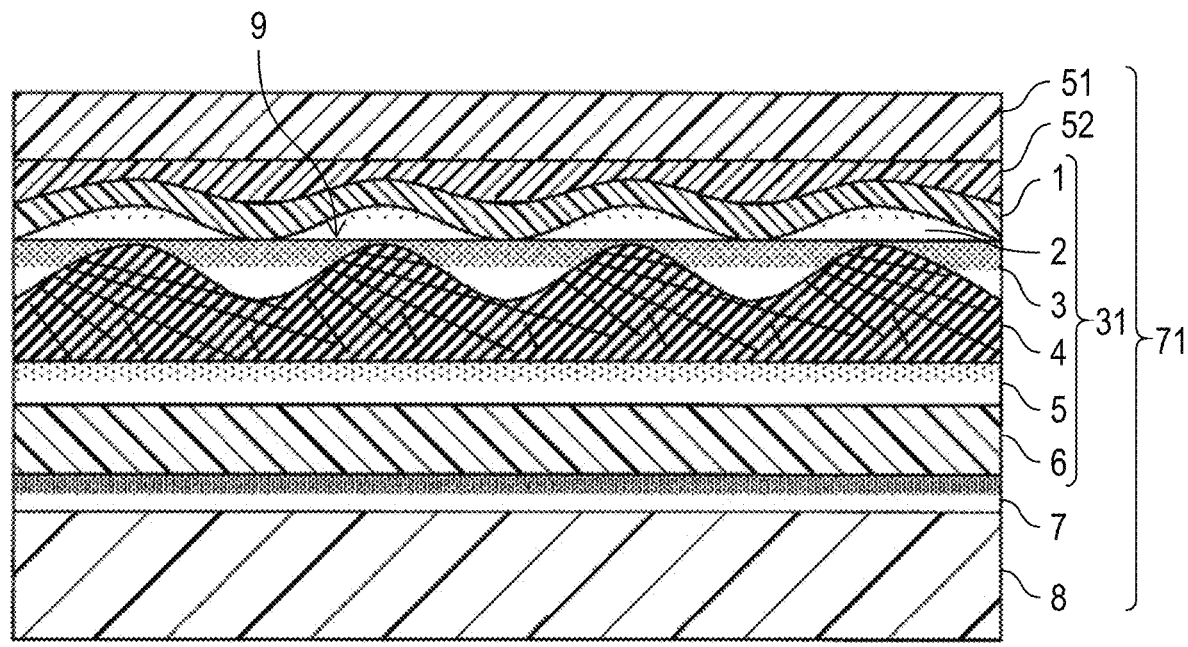
FIG. 8 is a cross-sectional view schematically showing a cross-sectional structure of a molded product according to a second exemplary embodiment of the present disclosure.
Figure 9:
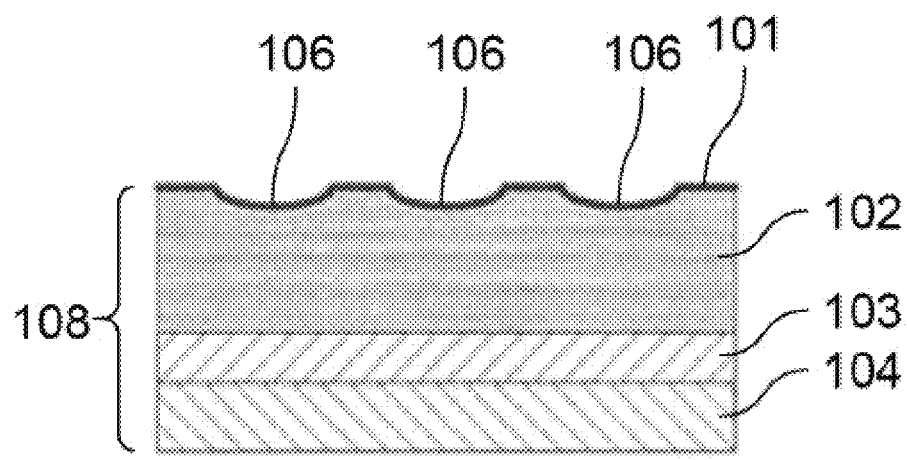
FIG. 9 is a cross-sectional view of a wood decorative molded product of Japanese Patent Unexamined Publication No. 2019-64168.
Figure 10:
FIG. 10 is a cross-sectional view of a transfer film of Japanese Patent Unexamined Publication No. 2019-64168.

FIG. 8 is a cross-sectional view schematically showing a cross-sectional structure of molded product 71 according to the second exemplary embodiment of the present disclosure using wood sheet 31.

Molded product 71 according to the second exemplary embodiment is different from wood sheet 31 according to the first exemplary embodiment in that fourth adhesive layer 7 and resin housing 8 are provided on the surface of support layer 6 opposite to thermoplastic shape conforming layer 5.

Fourth adhesive layer 7 and resin housing 8 are integrated on support layer 6 side of wood sheet 31 by, for example, vacuum-pressure forming or insert molding to form molded product 71. In the second exemplary embodiment, fourth adhesive layer 7 and resin housing 8 are formed on wood sheet 31 before base film 51 and release layer 52 are removed.

Fourth Adhesive Layer

Fourth adhesive layer 7 adheres support layer 6 and resin housing 8. For example, fourth adhesive layer 7 may be composed of either a thermoplastic adhesive such as a coating method or a sheet shape, or a thermosetting adhesive. The average film thickness of fourth adhesive layer 7 may be, for example, 1 μm or more and 100 μm or less.

Resin Housing

Resin housing 8 serves to improve the strength of wood sheet 31. Resin housing 8 is formed of, for example, a general-purpose molding resin such as a PMMA resin, an ABS resin, a PS resin, or a PC resin. Further, resin housing 8 may be formed of a resin that needs to be molded at a high temperature, such as a resin for optical use or a super engineering resin.

In the method for manufacturing molded product 71, after performing steps S11 to S15 of the first exemplary embodiment, resin housing 8 is formed on support layer 6 side of the laminate (step S16). Resin housing 8 may be injection-molded in advance, and in step S16, resin housing 8 may be attached to support layer 6 side of the laminate, or resin housing 8 may be injection-molded directly on support layer 6 side of the laminate.

Effect

With molded product 71 according to the second exemplary embodiment, the following effects can be obtained.

Molded product 71 includes wood sheet 31 and resin housing 8 disposed on support layer 6 side of wood sheet 31.

With such a configuration, the strength of molded product 71 can be improved.

The method for manufacturing molded product 71 includes manufacturing wood sheet 31 according to the above-mentioned manufacturing method, and further forming resin housing 8 on support layer 6 side of the laminate.

By such a method, molded product 71 having resin housing 8 can be formed.

In the second exemplary embodiment, although an example in which wood sheet 31 and resin housing 8 are integrated has been described, it is also possible to attach wood sheet 31 according to the first exemplary embodiment by itself like a wallpaper.

In the second exemplary embodiment, although an example in which resin housing 8 is formed of a general-purpose molding resin has been described, other materials may be used as long as the members have the required strength.

In the second exemplary embodiment, although an example of molded product 71 provided with fourth adhesive layer 7 has been described, the present disclosure is not limited thereto. For example, when insert molding is performed using a member having a fiber layer such as a non-woven fabric in support layer 6, an anchor effect is produced by a molding resin entering gaps between the fibers, and molded product 71 can be formed without forming fourth adhesive layer 7.

In the second exemplary embodiment, although an example in which release layer 52 and base film 51 are not removed and wood sheet 31 is integrated with resin housing 8 has been described, the present disclosure is not limited thereto. The removal of release layer 52 and base film 51 can be optionally selected depending on the application in integrating with resin housing 8.

Although the present disclosure has been fully described in connection with preferred exemplary embodiments with reference to the accompanying drawings, various modifications and amendments are obvious to those skilled in the art. Such modifications and amendments should be understood to be included within the scope of the present disclosure by the appended claims unless departing from the gist of the present disclosure.

The wood sheet and the molded product of the present disclosure are useful for decorating exteriors of home electric appliances and interiors of vehicles.

What is claimed is:

1. A wood sheet consisting of:
   a support layer formed of a polymer film or nonwoven fabric;
   a thermoplastic shape conforming layer disposed on the support layer, the thermoplastic shape conforming layer being made of a transparent thermoplastic material;
   a wood material disposed on the thermoplastic shape conforming layer, the wood material including water vapor and impregnated resin;
   a second adhesive layer disposed on the wood material, the second adhesive layer being containing a second crosslinking structure within the layer;
   a first adhesive layer disposed on the second adhesive layer, the first adhesive layer containing a first crosslinking structure which is different from the second crosslinking structure;
   a protective layer disposed on the first adhesive layer,
   optionally, a release layer disposed on a surface of the protective layer opposite to the first adhesive layer;
   optionally, a base film disposed on a surface of the release layer opposite to the protective layer; and
   optionally, a third adhesive layer provided between the wood material and the thermoplastic shape conforming layer, wherein
the first adhesive layer containing the first crosslinking structure and the second adhesive layer containing the second crosslinking structure are laminated adjacent to each other, and
a two-layer structure consisting of the first adhesive layer and the second adhesive layer prevents the water vapor and the impregnated resin contained in the wood material from leaking out from the wood material.

2. The wood sheet of claim 1, wherein
the wood material has an irregular surface shape,
the second adhesive layer has penetrated into a concave portion of the irregular surface shape of the wood material, and
no air layer is between the second adhesive layer and the irregular surface shape of the wood material.

3. The wood sheet of claim 1, wherein
an average film thickness of the first adhesive layer is 3 µm or more and 100 µm or less, and
an average film thickness of the second adhesive layer is 10 µm or more and 100 µm or less.

4. The wood sheet of claim 1, wherein
the release layer is disposed on a surface of the protective layer opposite to the first adhesive layer, wherein the protective layer has a film thickness of 3 µm or more and 100 µm or less, and has a hard coat function and a UV cut function,
the base film is disposed on a surface of the release layer opposite to the protective layer, and
the release layer and the base film are removable from the protective layer at an interface between the release layer and the protective layer.

5. The wood sheet of claim 1, wherein
the third adhesive layer is provided between the wood material and the thermoplastic shape conforming layer.

6. A molded product comprising:
the wood sheet of claim 1; and
a resin housing disposed on the support layer side of the wood sheet.

7. The wood sheet of claim 1, wherein
the support layer is formed of a polymer film.

8. The wood sheet of claim 1, wherein
an average film thickness of the thermoplastic shape conforming layer is 50 µm or more and 200 µm or less.

9. The wood sheet of claim 1, wherein
the third adhesive layer is provided between the wood material and the thermoplastic shape conforming layer,
the second adhesive layer and the third adhesive layer cover both sides of the wood material, and
the second adhesive layer and the third adhesive layer prevents the water vapor and the impregnated resin contained in the wood material from flowing out from the wood material.

10. The wood sheet of claim 1, wherein the first adhesive layer has the first crosslinked structure having a urethane bond.

11. The wood sheet of claim 1, wherein the first adhesive layer has the first crosslinked structure having a urethane bond resulting from a blocked isocyanate-based curing agent.

* * * * *